(12) United States Patent
Connor et al.

(10) Patent No.: US 7,143,615 B2
(45) Date of Patent: Dec. 5, 2006

(54) METHOD, SYSTEM, AND PROGRAM FOR DISCOVERING COMPONENTS WITHIN A NETWORK

(75) Inventors: William H. Connor, Boulder, CO (US); Jeffrey A. Hanson, Westminster, CO (US); Brandon E. Taylor, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 798 days.

(21) Appl. No.: 10/209,544

(22) Filed: Jul. 31, 2002

(65) Prior Publication Data

US 2004/0024863 A1 Feb. 5, 2004

(51) Int. Cl.
*G06F 15/173* (2006.01)

(52) U.S. Cl. .................... 70/224; 709/223; 709/230; 709/220; 370/352; 714/39

(58) Field of Classification Search ............... 709/223, 709/224, 251, 230, 220; 711/6, 152, 141; 714/4, 39; 707/201, 104; 704/235; 705/7; 719/310

See application file for complete search history.

(56) References Cited

U.S. PATENT DOCUMENTS

| | | | |
|---|---|---|---|
| 2,012,527 A | 8/1935 | Batchelder | |
| 2,675,228 A | 4/1954 | Baird et al. | |
| 3,571,677 A | 3/1971 | Oeschger | |
| 4,138,692 A | 2/1979 | Meeker et al. | |
| 4,229,821 A | 10/1980 | De Jager et al. | |
| 4,558,395 A | 12/1985 | Yamada | |
| 4,665,466 A | 5/1987 | Green | |
| 4,721,996 A | 1/1988 | Tustaniwskyj | |
| 4,729,424 A | 3/1988 | Mizuno | |
| 4,733,331 A | 3/1988 | Chauvet | |
| 4,791,983 A | 12/1988 | Nicol | |
| 4,809,134 A | 2/1989 | Tustaniwskyj | |
| 4,870,477 A | 9/1989 | Nakanishi | |
| 4,882,654 A | 11/1989 | Nelson | |
| 4,977,444 A | 12/1990 | Nakajima | |
| 5,144,531 A | 9/1992 | Go | |

(Continued)

FOREIGN PATENT DOCUMENTS

EP 0 623 876 A1 11/1994

(Continued)

OTHER PUBLICATIONS

Automatically Validating Temporal Safety Properties of Interfaces—Ball, Rajamani (2001) www.research.microsoft.com/SLAM/papers/pldi-slam.pdf.*

(Continued)

*Primary Examiner*—Thong Vu
(74) *Attorney, Agent, or Firm*—Dorsey & Whitney LLP

(57) ABSTRACT

Provided are a computer implemented method, system, and program for discovering components within a network. A discovery operation is initiated to discover a network component. Upon discovering information on one network component, an entry is added to a data store providing information on the discovered component. In response to adding the entry to the data store, at least one of a plurality of programs is called to process the added entry, wherein each called program either accepts or declines to process the added entry. One program accepting to process the added entry initiates a further discovery operation in response to accepting the added entry. A new entry is added to the data store providing information on one network component discovered during the further discovery operation, wherein at least one program is called to process the new entry in response to adding the new entry.

57 Claims, 10 Drawing Sheets

U.S. PATENT DOCUMENTS

| | | | |
|---|---|---|---|
| 5,166,863 A | 11/1992 | Shmunis | |
| 5,177,667 A | 1/1993 | Graham | |
| 5,183,104 A | 2/1993 | Novotny | |
| 5,282,847 A | 2/1994 | Koizumi | |
| 5,305,461 A | 4/1994 | Feigenbaum et al. | |
| 5,323,847 A | 6/1994 | Koizumi | |
| 5,406,807 A | 4/1995 | Ashiwake | |
| 5,465,192 A | 11/1995 | Yoshikawa | |
| 5,504,858 A | 4/1996 | Ellis et al. | |
| 5,535,094 A | 7/1996 | Nelson | |
| 5,588,119 A | 12/1996 | Vincent | |
| 5,675,473 A | 10/1997 | McDunn | |
| 5,701,045 A | 12/1997 | Yokozawa | |
| 5,706,668 A | 1/1998 | Hilpert | |
| 5,751,933 A | 5/1998 | Dev | |
| 5,771,388 A | 6/1998 | Mondrik et al. | |
| 5,912,802 A | 6/1999 | Nelson | |
| 5,940,269 A | 8/1999 | Ko | |
| 5,950,011 A | 9/1999 | Albrecht | |
| 5,956,750 A | 9/1999 | Yamamoto et al. | |
| 5,999,974 A * | 12/1999 | Ratcliff et al. | 709/224 |
| 6,006,251 A | 12/1999 | Toyouchi et al. | |
| 6,029,742 A | 2/2000 | Burward-Hoy | |
| 6,031,528 A | 2/2000 | Langfahl | |
| 6,049,390 A * | 4/2000 | Notredame et al. | 358/1.15 |
| 6,050,327 A | 4/2000 | Gates | |
| 6,058,426 A | 5/2000 | Godwin et al. | |
| 6,067,545 A | 5/2000 | Wolff | |
| 6,067,559 A | 5/2000 | Allard et al. | |
| 6,101,616 A | 8/2000 | Joubert | |
| 6,118,776 A | 9/2000 | Berman | |
| 6,119,118 A | 9/2000 | Kain et al. | |
| 6,125,924 A | 10/2000 | Lin | |
| 6,130,820 A | 10/2000 | Konstad | |
| 6,135,200 A | 10/2000 | Okochi | |
| 6,137,680 A | 10/2000 | Kodaira | |
| 6,144,379 A | 11/2000 | Bertram | |
| 6,151,031 A | 11/2000 | Atkins et al. | |
| 6,151,331 A | 11/2000 | Wilson | |
| 6,167,445 A | 12/2000 | Gai et al. | |
| 6,182,142 B1 | 1/2001 | Win et al. | |
| 6,205,796 B1 | 3/2001 | Chu | |
| 6,205,803 B1 | 3/2001 | Scaringe | |
| 6,213,194 B1 | 4/2001 | Chrysler | |
| 6,229,538 B1 | 5/2001 | McIntyre | |
| 6,243,747 B1 | 6/2001 | Lewis et al. | |
| 6,260,120 B1 * | 7/2001 | Blumenau et al. | 711/152 |
| 6,269,396 B1 * | 7/2001 | Shah et al. | 709/223 |
| 6,301,605 B1 | 10/2001 | Napolitano et al. | |
| 6,313,990 B1 | 11/2001 | Cheon | |
| 6,314,555 B1 | 11/2001 | Ndumu et al. | |
| 6,381,637 B1 | 4/2002 | Kamada | |
| 6,392,667 B1 | 5/2002 | McKinnon et al. | |
| 6,396,697 B1 | 5/2002 | Chen | |
| 6,408,336 B1 | 6/2002 | Schneider et al. | |
| 6,425,005 B1 | 7/2002 | Dugan et al. | |
| 6,425,007 B1 | 7/2002 | Messinger | |
| 6,438,984 B1 | 8/2002 | Novotny | |
| 6,463,454 B1 | 10/2002 | Lumelsky et al. | |
| 6,477,572 B1 | 11/2002 | Elderton | |
| 6,487,643 B1 | 11/2002 | Khare et al. | |
| 6,496,871 B1 | 12/2002 | Jagannathan et al. | |
| 6,496,893 B1 * | 12/2002 | Arai | 710/302 |
| 6,505,243 B1 * | 1/2003 | Lortz | 709/220 |
| 6,505,244 B1 | 1/2003 | Natarajan et al. | |
| 6,526,768 B1 | 3/2003 | Wall | |
| 6,542,360 B1 | 4/2003 | Koizumi | |
| 6,560,569 B1 * | 5/2003 | Abu El Ata | 703/2 |
| 6,574,708 B1 | 6/2003 | Hayter et al. | |
| 6,587,343 B1 | 7/2003 | Novotny | |
| 6,601,186 B1 * | 7/2003 | Fox et al. | 714/4 |
| 6,604,136 B1 | 8/2003 | Chang et al. | |
| 6,604,137 B1 | 8/2003 | Cowan | |
| 6,604,210 B1 * | 8/2003 | Alexander et al. | 714/39 |
| 6,628,304 B1 | 9/2003 | Mitchell | |
| 6,636,239 B1 | 10/2003 | Arquie | |
| 6,640,278 B1 * | 10/2003 | Nolan et al. | 711/6 |
| 6,658,526 B1 | 12/2003 | Nguyen et al. | |
| 6,665,725 B1 * | 12/2003 | Dietz et al. | 709/230 |
| 6,671,776 B1 | 12/2003 | DeKoning | |
| 6,704,778 B1 | 3/2004 | Horman | |
| 6,708,291 B1 * | 3/2004 | Kidder | 714/39 |
| 6,714,936 B1 | 3/2004 | Nevin | |
| 6,748,498 B1 * | 6/2004 | Gharachorloo et al. | 711/141 |
| 6,760,761 B1 | 7/2004 | Sciacca | |
| 6,772,204 B1 | 8/2004 | Hansen | |
| 6,775,700 B1 | 8/2004 | Cheng et al. | |
| 6,799,208 B1 | 9/2004 | Sankaranarayan et al. | |
| 6,823,382 B1 | 11/2004 | Stone | |
| 6,834,298 B1 | 12/2004 | Singer et al. | |
| 6,845,395 B1 | 1/2005 | Blumenau et al. | |
| 6,871,232 B1 | 3/2005 | Curie et al. | |
| 6,950,833 B1 * | 9/2005 | Costello et al. | 707/201 |
| 7,003,560 B1 * | 2/2006 | Mullen et al. | 709/223 |
| 7,047,290 B1 * | 5/2006 | Murotani et al. | 709/223 |
| 2001/0039576 A1 * | 11/2001 | Kanada | 709/223 |
| 2001/0043617 A1 | 11/2001 | McKinnon | |
| 2001/0044907 A1 | 11/2001 | Yoshimoto et al. | |
| 2002/0019864 A1 | 2/2002 | Mayer | |
| 2002/0069377 A1 | 6/2002 | Mabuchi et al. | |
| 2002/0083169 A1 | 6/2002 | Aki et al. | |
| 2002/0113816 A1 | 8/2002 | Mitchell et al. | |
| 2002/0133504 A1 * | 9/2002 | Vlahos et al. | 707/104.1 |
| 2002/0133669 A1 | 9/2002 | Devireddy et al. | |
| 2002/0143905 A1 | 10/2002 | Govindarajan et al. | |
| 2002/0143920 A1 | 10/2002 | Dev et al. | |
| 2002/0147801 A1 | 10/2002 | Gullotta et al. | |
| 2002/0152305 A1 | 10/2002 | Jackson et al. | |
| 2002/0162010 A1 | 10/2002 | Allen et al. | |
| 2002/0169858 A1 | 11/2002 | Bellinger et al. | |
| 2002/0174215 A1 * | 11/2002 | Schaefer | 709/224 |
| 2002/0178380 A1 | 11/2002 | Wolf et al. | |
| 2002/0184300 A1 | 12/2002 | Schmelling et al. | |
| 2002/0188584 A1 | 12/2002 | Ghannam | |
| 2002/0194407 A1 | 12/2002 | Kim | |
| 2003/0023435 A1 * | 1/2003 | Josephson | 704/235 |
| 2003/0028624 A1 | 2/2003 | Hasan et al. | |
| 2003/0033179 A1 * | 2/2003 | Katz et al. | 705/7 |
| 2003/0055972 A1 | 3/2003 | Fuller et al. | |
| 2003/0074599 A1 | 4/2003 | Golasky et al. | |
| 2003/0088658 A1 * | 5/2003 | Davies et al. | 709/223 |
| 2003/0091037 A1 | 5/2003 | Latif et al. | |
| 2003/0093501 A1 | 5/2003 | Carlson et al. | |
| 2003/0120822 A1 * | 6/2003 | Langrind et al. | 709/251 |
| 2003/0169289 A1 | 9/2003 | Holt | |
| 2003/0184580 A1 | 10/2003 | Kodosky et al. | |
| 2003/0217027 A1 * | 11/2003 | Farber et al. | 707/1 |
| 2003/0217139 A1 * | 11/2003 | Burbeck et al. | 709/224 |
| 2004/0006691 A1 * | 1/2004 | Winter et al. | 370/395.31 |
| 2004/0010586 A1 * | 1/2004 | Burton et al. | 709/224 |
| 2004/0019609 A1 * | 1/2004 | Orton et al. | 707/104.1 |
| 2005/0149376 A1 * | 7/2005 | Guyan et al. | 705/9 |
| 2005/0183090 A1 * | 8/2005 | Hunt | 719/310 |

FOREIGN PATENT DOCUMENTS

| | | |
|---|---|---|
| EP | 0 773 649 A2 | 5/1997 |
| EP | 1 111 840 A2 | 6/2001 |
| GB | 2 278 468 A | 11/1994 |
| GB | 2 344 963 A1 | 6/2000 |
| GB | 2 354 611 A1 | 3/2001 |
| WO | WO9842102 A1 | 9/1998 |
| WO | WO0029954 A1 | 5/2000 |
| WO | WO0072183 A2 | 11/2000 |

| | | | |
|---|---|---|---|
| WO | WO 0130007 A2 | 4/2001 | |
| WO | WO0225870 A1 | 3/2002 | |
| WO | WO 02089418 A1 | 11/2002 | |
| WO | WO03014911 A1 | 2/2003 | |

OTHER PUBLICATIONS

Discovering Web Access Patterns and Trends by Applying.. - Zaïane, Xin, Han (1998) ftp.fas.sfu.ca/pub/cs/han/kdd/weblog98.ps.*

WISE: A World Wide Web Resource Database System—Yuwono, Lee (1996) fwww.cs.ust.hk/~dlee/Papers/www/tkde.ps.gz.*

A Self-Configuring Resolver Architecture for Resource.. - Adjie Winoto (2000) (Correct) (4 citations) nms.lcs.mit.edu/papers/wadjie-thesis.ps.gz.*

Buschman, et al. "Pattern Oriented Software Architecture, vol. I: A System of Patterns," pp. 71-95. New York: John Wiley & Sons, 1996.

"Pattern: *Blackboard*," pp. 1-2 [online] [retrieved on Jul. 12, 2002] Retrieved from http://www.vico.org/pages/Patrons%20Blackboard.

Business Editors & High-Tech Writers, "Tivoli Simplifies SAN Management", Business Wire, Oct. 9, 2000, New York.

Anonymous, "Jini: New Technology for a Networked World", URL:http://javaworld.com/javaworld/jw-06-1999/jw-06-jiniology_p.html, Jun. 30, 1999, pp. 1-5.

Anonymous, "Pattern: Blackboard", http://www.vico.org/pages/Patrons%20Blackboard, Jul. 12, 2002, pp. 1-2.

Anonymous, "Javaone-Sun's 2000 Worldwide Java Developer Conference", http://servlet.java.sun.com/javaone/javaone2000/pdfs/TS-1156.pdf, Nov. 24, 2003.

Brent Knight, "Reducing the Complexity of Managing Private Loops", / /, p. 1-11.

Bushman, "Pattern Oriented Software Architecture, A System of Patterns", / /, pp. 71-95, John Wiley & Sons, New York.

Dupuy, et al., "NETMATE: A Network Management Environment", IEEE Network, Mar. 5, 1991, p. 35-40, 43, New York.

Finke, et al., "Distribution and Inheritance in the HERON Approach to Heterogeneous Computing", Proceedings of the Int's Conf on Distributed Computing Systems, May 25, 1993, p. 399-408, IEEE Comp Soc Press, Los Alamitos.

Richard, "Fibre Channel as a Network Backbone", WESCON/94, IDEA/MICROELECTRONICS, Conference record Anaheim, p. 653-659, New York.

U.S. Appl. No. 10/208,958, filed Jul. 31, 2002, Allen.

Anonymous, "Jiro Technology Technical Overview", URL:http://sunsolve.sun.com/kmsattachments/22961, 2000.

Anonymous, "Sun's Managed Storage Networks", URL:http/sunsolve.sun.com/kmsattachments/22955, 2000.

Anonymous, "Jiro Technical Overview White Paper, Free White Papers/Tech Bulletins, Sun-Solve Search Result", URL:http://sunsolve.sun.com/pub-cgi/retrieve.pl?doc=fwpaper/22961@zone_32=jiro, Jun. 28, 2000.

Anonymous, "Managed Storage Networks White Paper, Free White Papers/Tech Bulletins, Sun-Solve Search Result", URL:http://sunsolve.sun.com/pub-cgi/retrieve.pl?doc=fwpaper/22955@zone_32=managed, Jun. 28, 2000.

Blake, "An Agent-Based Cross-Organizational Workflow Architecture in Support of Web Services", Proceedings of 11th IEEE int'l Workshops on Enabling Tech., 2002 IEEE, Computer Science.

Cazalens, et al., "A Web Site Indexing Process for an Internet Information Retrievel Agent System", Unknown, 2000 IEEE, 254-258, Unknown, Nantes Cedex.

Martin, Jean-Christophe, "Policy-Based Networks", URL:http://www.sun.com/solutions/blueprints/1099/policy.pdf, date unknown.

Mukhopadha, et al., "Multi-Agent Marko v Decision Processes With Limited Agent Communication", Proceedings of the 2001 IEEE, Sep. 5-7, 2001, pp. 7-12, Mexico City.

Wilson, Steven, "Fibre Channel Storage Area Network Discovery of Brocade Communications Systems, Inc.", Sep. 10, 1999, 1-20.

* cited by examiner

METHOD, SYSTEM, AND PROGRAM FOR DISCOVERING COMPONENTS WITHIN A NETWORK

BACKGROUND OF THE INVENTION

1. Field of the Invention

The present invention relates to a method, system, and program for discovering components in a network.

2. Description of the Related Art

A storage area network (SAN) comprises a network linking one or more servers to one or more storage systems. Each storage system could comprise a Redundant Array of Independent Disks (RAID) array, tape backup, tape library, CD-ROM library, or JBOD (Just a Bunch of Disks) components. One common protocol for enabling communication among the various SAN devices is the Fibre Channel protocol, which uses optical fibers or copper wires to connect devices and provide high bandwidth communication between the devices. The Fibre Channel protocol defines a fabric topology. A fabric includes one or more interconnected switches, each switch having multiple ports. A fiber link may connect ports on a device to ports on a switch, where a device connected to a switch in a fabric can communicate with all other ports attached to any switch in the fabric.

During SAN operations, information on various devices in one or more fabrics in a SAN may be gathered. Such information includes the identity of a device and the relationship such device has with other devices, which includes both logical and physical connections with other devices. The information may concern devices from different vendors and thus require the use of management interfaces provided by the vendors whose components participate in the SAN. Prior art SAN discovery tools often utilize discovery routines that operate based on knowledge of the system configuration. Such discovery tools thus assume that a certain configuration is in place and that such configuration can be queried using the management interfaces provided specifically for the assumed components. However, discovery of the components within a SAN environment is often non-deterministic in that components may be removed and added. Moreover, failures in certain of the network components may not be detected, resulting in the discovery database having incomplete information. Prior art discovery tools may thus have difficulty handling such changes or errors because if the discovery tool is not configured to look for new or different SAN components, then such components may not be located.

Thus, there is a need in the art for improved techniques for discovering the components available in a SAN.

SUMMARY OF THE DESCRIBED IMPLEMENTATIONS

Provided are a computer implemented method, system, and program for discovering components within a network. A discovery operation is initiated to discover a network component. Upon discovering information on one network component, an entry is added to a data store providing information on the discovered component. In response to adding the entry to the data store, at least one of a plurality of programs is called to process the added entry, wherein each called program either accepts or declines to process the added entry. One program accepting to process the added entry initiates a further discovery operation in response to accepting the added entry. A new entry is added to the data store providing information on one network component discovered during the further discovery operation, wherein at least one program is called to process the new entry in response to adding the new entry.

In further implementations, the steps of calling the programs to process a recently added entry to initiate further discovery operations are repeated until a final pass state is reached.

In yet further implementations, a final pass state is detected and in response to detecting the final pass state, a call is made that causes at least one of the programs to perform operations. In such implementations, the final pass state may occur when all the called programs decline to process the added entry and when there are no pending discovery operations initiated by programs that have accepted one added entry.

In certain implementations, the network components may comprise one of a switch, switch ports, a host system, host bus adaptor (HBA), host ports, storage system, storage system ports, and zones.

Certain implementations utilize a blackboard architecture, wherein a blackboard component implements the data store and blackboard control calls the programs to process the added entry in response to entries being added to the data store, and wherein the programs comprise knowledge sources.

In still further implementations, the programs that accept to process added entries can submit concurrent tasks to perform concurrent operations with respect to at least one added entry.

The described implementations provide techniques for discovering components in a network system in a non-deterministic manner.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
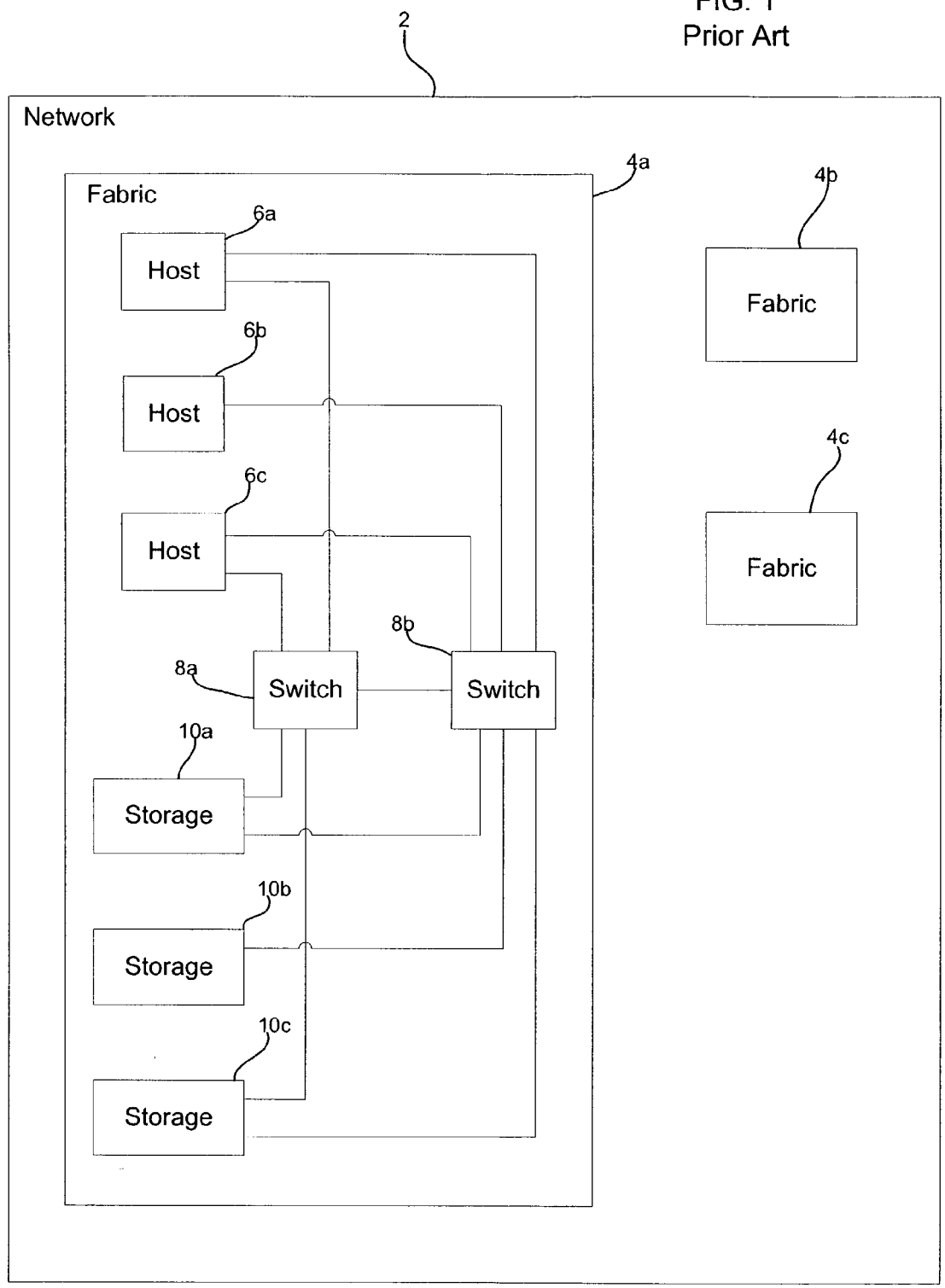
FIG. 1 illustrates an arrangement of network components in a manner known in the art.

FIG. 1 illustrates an example of a network 2, such as a SAN, comprised of multiple fabrics 4a, 4b, 4c, where each fabric includes multiple interconnected devices, also referred to as components, such that the switches in one fabric do not connect to any of the devices in another fabric. As shown in fabric 4a, a fabric includes hosts 6a, 6b, 6c, switches 8a, 8b and storage systems 10a, 10b, 10c, where each device in the fabric is connected to one or more other devices in the fabric. The hosts 6a, 6b, 6c, switches 8a, 8b, and storage systems 10a, 10b, 10c would further each include one or more ports (not shown) to provide one or more connections with another component. The hosts 6a, 6b, 6c include host bus adaptor (HBA) cards (not shown) that include the host ports to connect to switch ports. Further switch 8a and 8b ports may be included in zones, such that any device attached to a switch port in one particular zone can only communicate with devices attached to switch ports in the same zone.

The hosts 6a, 6b, 6c may comprise any computing device known in the art, such as a server class machine, workstation, etc., having adaptor cards with ports to connect to one switch port in switches 8a, 8b. The switches 8a, 8b may each include multiple switch ports to interconnect different devices in a network, such as a SAN, Local Area Network (LAN), Wide Area Network (WAN), etc. The storage systems 10a, 10b, 10c may comprise any storage system known in the art, such as a storage array, e.g., Just a Bunch of Disks (JBOD), storage subsystem, Redundant Array of Independent Disks (RAID), Direct Access Storage Device (DASD), etc., tape drive, tape library, disk drive, optical disk drive, etc. The network 2 or SAN may further include direct attached storage (DAS) devices that connect directly to another host or device other than a switch and orphan devices not connected to any other component.

Figure 2:
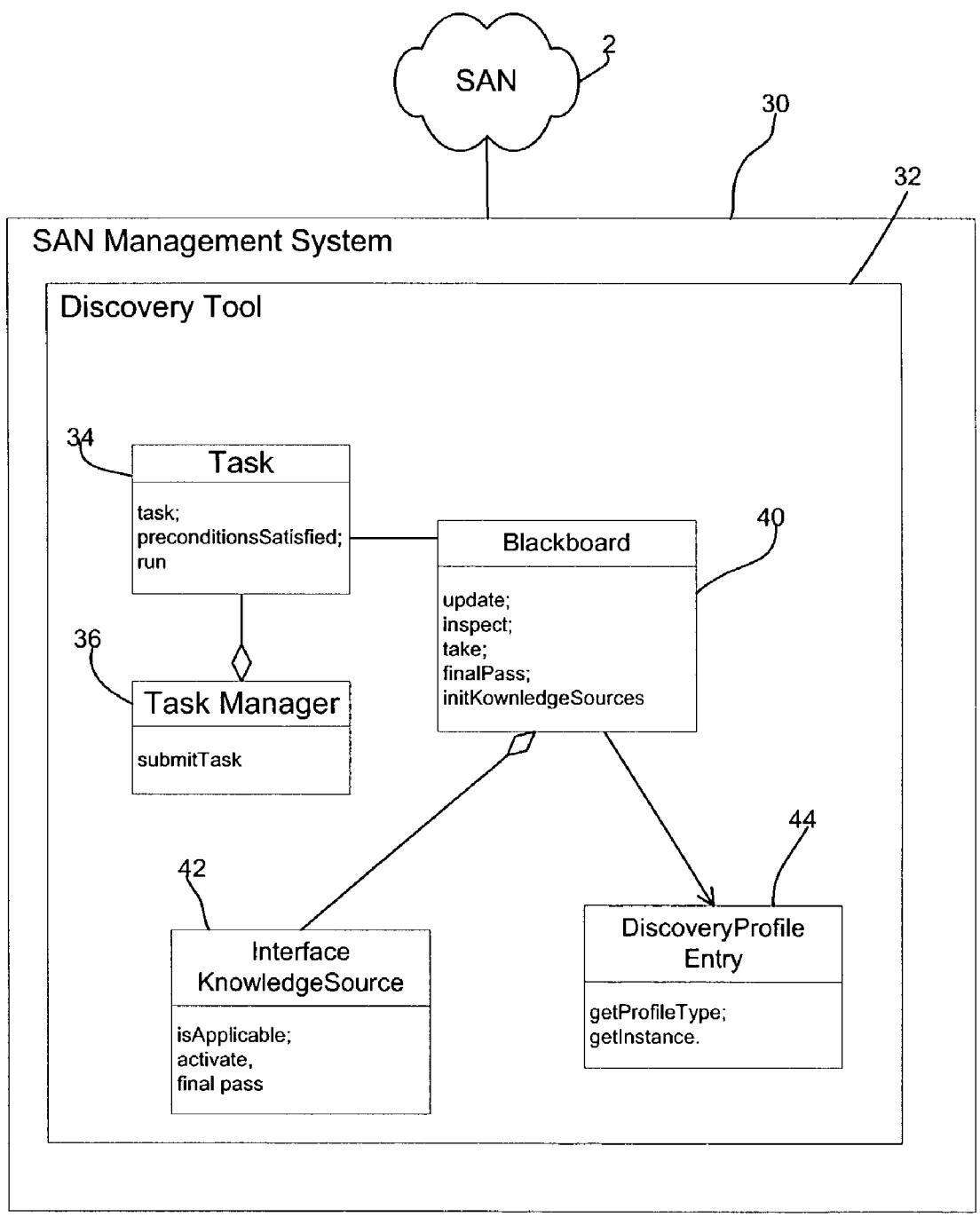
FIG. 2 illustrates program classes in a discovery tool used to discover network components in accordance with implementations of the invention.

FIG. 2 illustrates a SAN management system 30 used by a network administrator, where the system 30 may be coupled to the SAN 2 or implemented in a SAN component. The SAN management system 30 includes a discovery tool 32 program that mines device information from the SAN 2 on the components of the SAN 2, where a component comprises a logical or physical device, e.g., hosts 6a, 6b, 6c, switches 8a, 8b, storage systems 10a, 10b, 10c, adaptors with the devices, ports, logical storage, zones, fabrics, etc. Thus, each component discovered by the discovery tool 32 may contain additional discovered components. For instance a discovered host 6a, 6b, 6c may include a discovered host bus adaptor (HBA), and the discovered HBA may include discovered ports; a discovered zone component may include device components and subcomponents; a discovered fabric may include numerous discoverable devices and subcomponents thereof.

In certain implementations, the discovery tool 32 may utilize a "blackboard" software architecture. The book "Pattern Oriented Software Architecture, Volume 1: A System of Patterns" by Frank Buschman, et al. (1996) at pages 71–95 provides further details on the "blackboard" architecture, which book is incorporated herein by reference in its entirety. The blackboard architecture provides a framework for solving problems that do not have a deterministic solution. This architecture uses a collection of independent programs to work cooperatively using a common data structure. Each program is specialized for solving a particular part of the overall task, and all the programs work together on the solution. These specialized programs may be independent of each other and may not call each other, nor have a predetermined sequence of activation. Instead, the sequence of operations in the blackboard system is primarily determined by the current state of progress. A central control component, which may be encapsulated in the blackboard implementations, evaluates the current state of processing and coordinates the specialized programs. This data-directed control regime makes experimentation with different algorithms possible, and allows experimentally-derived heuristics to control processing. Certain described implementations of the discovery tool 32 utilize the blackboard framework to determine the components in the SAN.

FIG. 2 shows the discovery tool 32 as implementing classes including Task 34, TaskManager 36, Blackboard 40, interface KnowledgeSource 42, and DiscoveryProfileEntry 42. The discovery tool 32 would generate network component information using the described class architecture and retain that information in persistent storage 66 (FIG. 3), which provides a persistent copy of all SAN component information gathered by the discovery tool 32. The Task class 34 provides functions to implement and manage a task that performs certain discovery operations, such as execute knowledge source modules. A Task is autonomous and allows for separate operations to be performed concurrently. The Task class 34 may include the following functions:

Task( ): generate a new task that will perform an operation.

preconditionSatisfied( ): returns true if all necessary preconditions are satisfied for the execution of a task.

run( ): this operation executes the task if all the preconditions have been satisfied, else if the preconditions are not satisfied, this function will requeue or terminate the task.

The TaskManager 36 class includes functions to accept and queue tasks for eventual execution, and may include a submitTask( ) function that queues a specified task for execution.

The Blackboard class 38 implements the blackboard, which provides a central data store to store information on SAN components discovered during the discovery operation and encapsulates the control logic. The Blackboard class 38 provides an interface to enable blackboard clients, including knowledge sources, to read and write to the blackboard data store. The Blackboard class 38 may include such functions as:

Blackboard( ): construct a new blackboard.

update( ): adds a specified entry to the blackboard data store and further performs a control pass over the blackboard. For each knowledge source, the isApplicable( ) method is invoked to determine whether the added entry is of a type to be processed by the called knowledge source. Additionally, the knowledge source may consider additional criteria other than type to determine whether to operate against an entry. If a knowledge source returns true in response to the isApplicable( ) call, then the activate( ) method is called to provide the knowledge source an opportunity to process the entry. If the knowledge source chooses to "take" the entry, it will return "true" and the blackboard control logic 54 will remove the entry to terminate the control pass so no additional knowledge sources will operate on the entry. If the knowledge source returns false from isApplicable( ), then that called knowledge source will not process the entry.

inspect( ): returns a list of blackboard entries that match some specified criteria.

take( ): if a specified entry is on the blackboard, remove the entry.

finalPass( ): if there are no pending tasks for this blackboard and no knowledge source responds with a true value to the isApplicable( ) calls made during a single control pass, then a final control pass is triggered. The finalPass( ) method is called for each knowledge source.

initKnowledgeSources( ): initializes a set of knowledge sources that will operate against the entries on the blackboard. This method will populate a knowledgeSources array, where the order of the knowledge sources in the array indicates the order in which the knowledge sources are given an opportunity to process an entry added to the data store.

The KnowledgeSource 42 interface provides functions implemented by each knowledge source instance. The KnowledgeSource 42 interface may include:

isApplicable( ): returns true if the knowledge source is coded to operate against a specified blackboard entry.

activate( ): performs an action with respect to a specified blackboard entry. Such action may involve calling update( ) methods to add one or more entries to the blackboard or update objects within one or more entries. The blackboard calls the activate( ) function if true is returned in response to the isApplicable( ) call. If true is returned from this method, then the knowledge source has completed its processing of the entry and is signaling that the entry should be removed from the data store 52 to preclude processing by any other knowledge sources.

finalPass( ): performs any final operations against the blackboard associated with this knowledge source.

Figure 3:
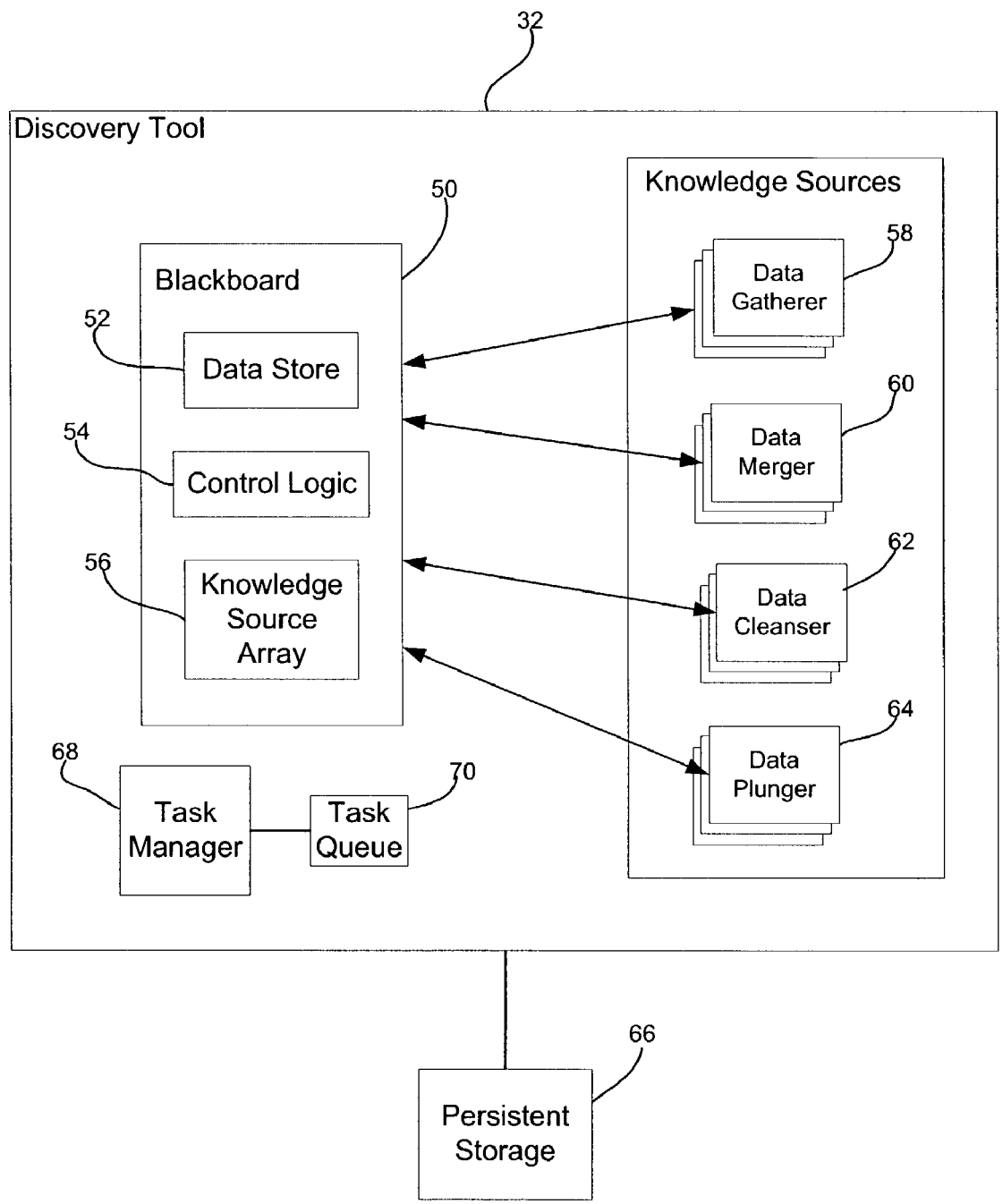
FIG. 3 illustrates discovery tool program components that discover network components in accordance with implementations of the invention.

FIG. 3 illustrates the run time program components implemented by the above described classes in the discovery tool 32. An instantiated blackboard 50 maintains a data store 52 that maintains entries, where each entry has information on a particular discovered SAN component, such as hosts, HBAs, storage systems, switches, software programs, etc. The control logic 54 provides the calls implemented in the blackboard 50 to initiate SAN discovery operations. A knowledge source array 56 provides a list of initialized knowledge sources 58, 60, 62, and 64. The knowledge sources 58, 60, 62, and 64 comprise separate, independent programs that solve specific aspects of the SAN discovery problem. In certain implementations, the knowledge source models a single aspect of the problem domain. Each knowledge source knows the conditions under which it can contribute to a solution. The knowledge sources may operate independently of other knowledge sources, and communicate indirectly with other knowledge sources by updating the blackboard data store 52, which may activate another knowledge source. A knowledge source evaluates an entry added to the blackboard and takes an action based on the content of the entry, which may involve calling the update( ) method to add a new entry or take( ) to remove an entry. A knowledge source may spawn one or more Tasks to perform some operation on the added entry.

In certain implementations, there may be four types of knowledge sources, including a data gatherer 58, data merger 60, data cleanser 62, and data plunger 64 (FIG. 3). There may be one or more of each knowledge source type. The data gatherer 58 knowledge source gathers information on a particular type of SAN component. For instance, if an entry is added indicating a detected host component in the SAN, a data gatherer knowledge source may be provided to activate in response to detecting the presence of a host to detect all HBAs within such detected host, another data gatherer may activate in response to an HBA entry to detect HBA ports, still further data gatherer knowledge sources may be activated to check any components attached to a port to gather information on the relationship of the components in the SAN. Other data gatherers 58 may be provided to check for zones, fabrics, storage arrays, switches, etc., and the connections therebetween, upon detecting an entry that may be used to locate such additional devices and connections. The data merger knowledge source 60 receives as input an added entry and locates inconsistent entries in the data store 52 with respect to the added entries. The data merger 60 modifies one or more of the inconsistent entries to leave one merged consistent entry in the data store 52. The data cleanser 62 inspects the entries in the data store 52 and compares with entries in persistent storage 66, which maintains persistent information on SAN components. The data cleanser 62 may remove entries from persistent storage 66 that are inconsistent with the newer information in the data entries in the data store 52. The data plunger 64 adds entries from the data store 52 to persistent storage 66.

In the discovery tool 32 runtime environment, a task manager 68 manages different tasks spawned by the knowledge sources 58, 60, 62, 64 to perform discovery and data store management related operations. The task manager 60 may queue received tasks in a task queue 70 and manage the execution of the tasks in the queue 70. The task queue 70 may organize entries in any manner known in the art, e.g., First-In-First-Out, a priority based scheme so that higher priority tasks are processed before lower priority tasks, etc. Alternatively, there may be multiple task queues. In this way, the knowledge sources 58, 60, 62, 64 may offload task execution by submitting their tasks to the task manager 68 to manage. This allows the blackboard components in the discovery tool 32 to concurrently execute discovery related operations. In certain implementations, the task manager 60 maintains a pool of threads that can be concurrently assigned to queued tasks.

Figure 4:
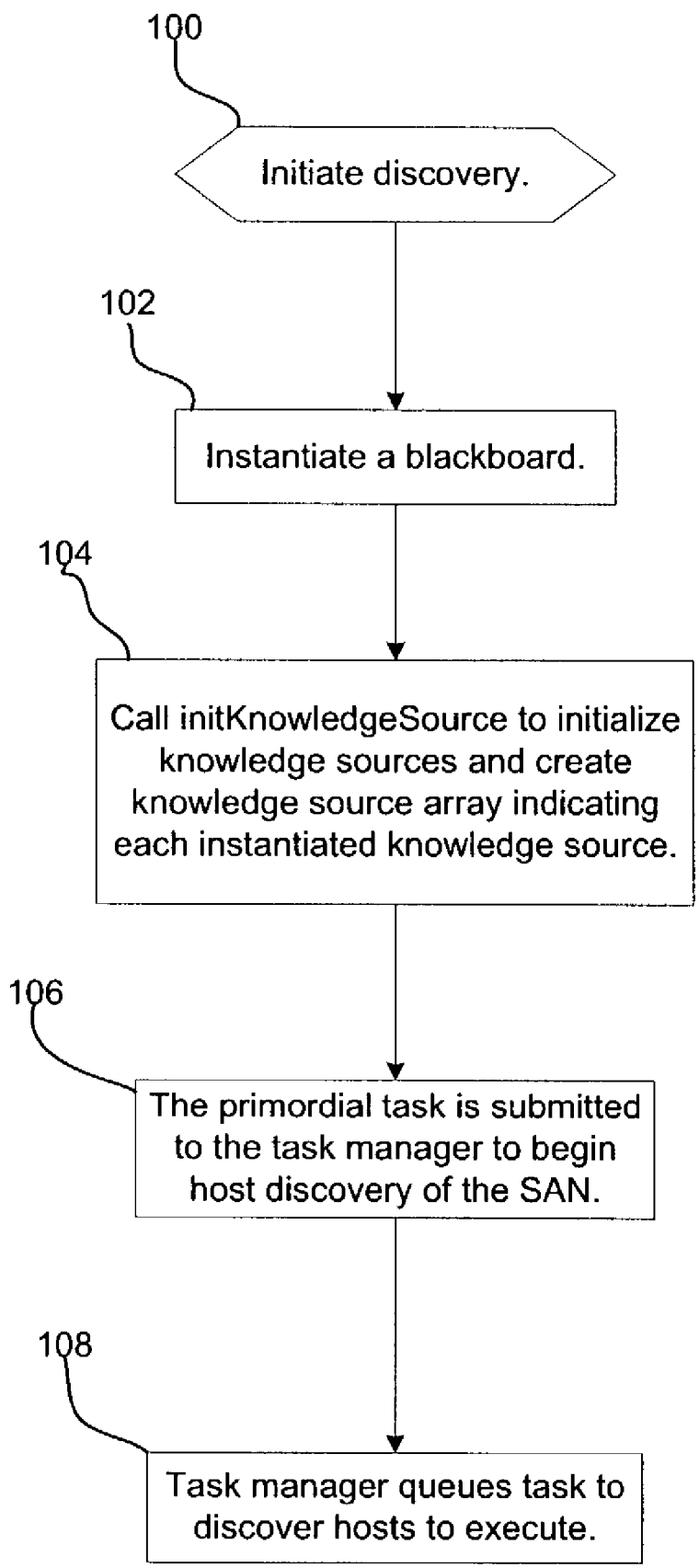
FIGS. 4–9 illustrate operations performed to discover network components in accordance with implementations of the invention.

FIG. 4 illustrates the logic to begin the discovery process, which begins at block 100. A blackboard 50 is instantiated (at block 102), including the data store 52 and the control logic 54 that performs blackboard 50 operations. The constructor of the blackboard 50 would call the initKnowledgeSources( ) method to initialize (at block 104) and instantiate all knowledge sources 58, 60, 62, 64 for the blackboard 50 and create a knowledge source array 56 providing a list of all the instantiated knowledge sources. The primordial task is submitted to the task manager 68 to begin the SAN discovery process. The task manager 68 may queue (at block 108) the received primordial task in the task queue 70 to execute. The initial primordial task may attempt to discover a specific type of device, such as hosts, to provide the first entries to add to the blackboard data store 52, and trigger the rest of the discovery process.

Figure 5:
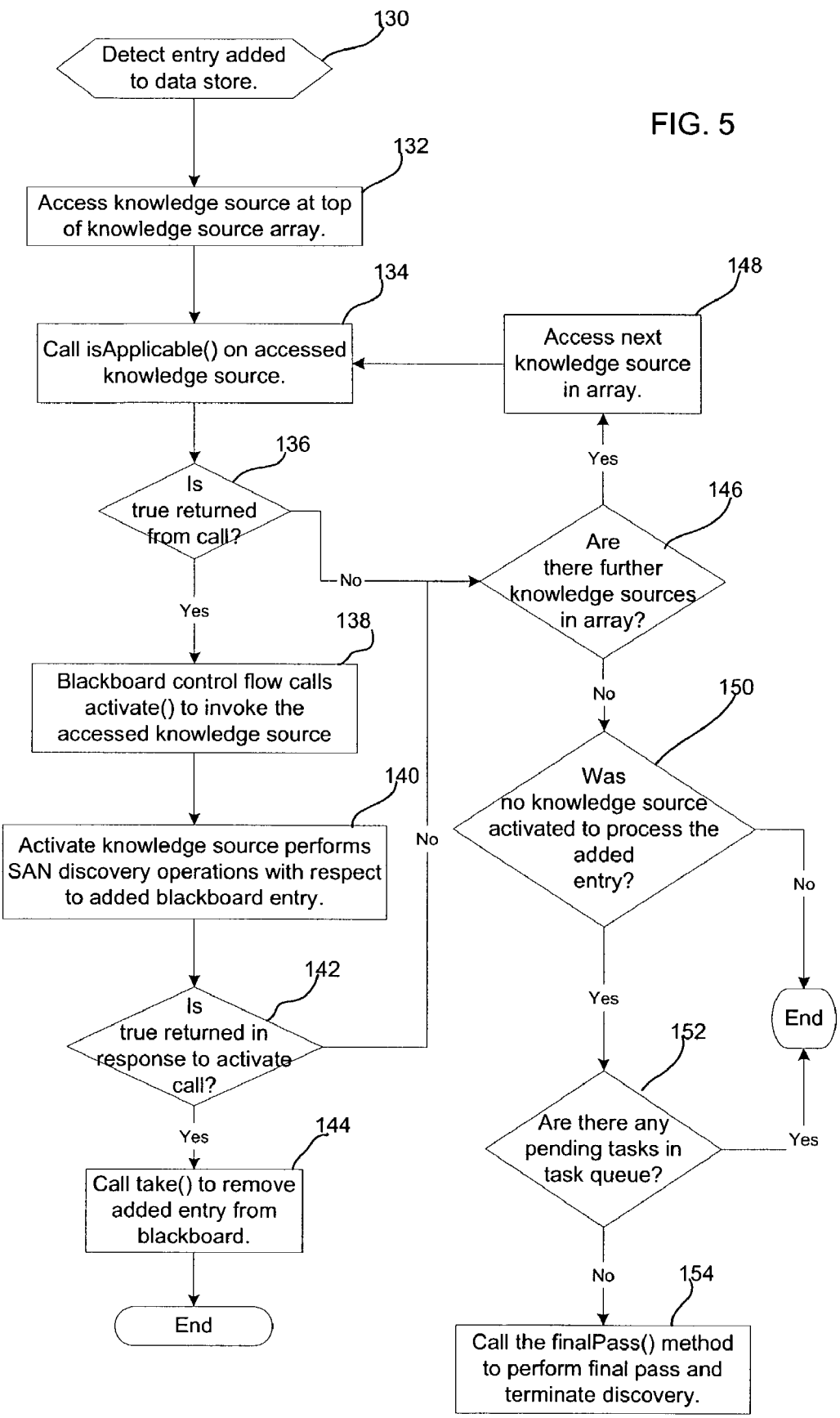

FIG. 5 illustrates logic implemented in the blackboard control logic 54 that is initiated in response to the blackboard 50 detecting (at block 130) an entry including information on a discovered SAN component being added to the data store 52. The control logic 54 accesses (at block 132) the knowledge sources 58, 60, 62, 64 from the knowledge source array 56 according to some ordering strategy. The control logic 54 calls (at block 134) the isApplicable( ) function on each accessed knowledge source 58, 60, 62, 64 to determine whether the entry added to the data store 52 is of the type that the called knowledge source 58, 60, 62, 64 handles. As mentioned, type may not be the only criteria that the knowledge source 58, 60, 62, 64 considers when determining whether to process the entry. If (at block 136) "true" is returned from the call, indicating the called knowledge source 58 is coded to process the added entry, then the control logic 54 calls (at block 138) the activate( ) function to activate the accessed knowledge source 58, 60, 62, 64. The activated knowledge source 58, 60, 62, 64 would then perform (at block 140) specific SAN discovery operations or data store management operations using the information in the added entry. For instance, if the added entry provided information on the host, then the activated knowledge source may include code to discover HBAs within the host indicated in the added entry, and then add entries to the data store 52 on the located HBAs; if the added entry provided information on a switch or storage, then the activated knowledge source may gather information on the ports, zones, logical units, etc. within the switch or storage system identified in the added entry. The activated knowledge source may further gather information on the connection and relationship of a discovered component to other discovered components. Further, the knowledge source may submit a Task to handle the operation, especially for those operations that take relatively longer to complete.

If (at block 142) "true" is returned in response to the activate( ) call, then it is assumed that the activated knowledge source 58, 60, 62, 64 has "taken" the entry, i.e., the take( ) method (at block 144), and that the entry will not remain in the blackboard data store 52. In such case, no further knowledge sources will operate on the added entry because the activated knowledge source has completed all necessary processing with respect to the added entry. If (at block 142) "true" is not returned in response to the activate( ) call, then the control logic 54 determines (at block 146) whether there are any further knowledge sources in the array 56 not yet considered. If not, control ends; otherwise, the control logic 54 accesses (at block 148) the next entry in the knowledge source array 56 and proceeds to block 134 to call the isApplicable( ) function on the new accessed knowledge source to determine whether to activate such new accessed knowledge source.

If (at block 136) "true" is not returned in response to the isApplicable( ) call, then the control logic 54 determines (at block 146) whether there are any further knowledge sources 58, 60, 62, 64 not yet considered in the array 56. If (at block 146) there are further knowledge sources to consider, then control proceeds to block 148 to access and call isApplicable( ) on the next accessed knowledge source. If (at block 146) there are no further knowledge sources in the array 56 to consider, then the control logic 54 determines whether to call the finalPass( ) method. Discovery ends after the final control pass. The finalPass( ) method is called (at block 154) if (at block 150) no knowledge source was activated for the entry during a single control pass. i.e., no knowledge source returned to "true" to the isApplicable( ) call, and if (at block 152) there are no pending tasks in the task queue 70. If no knowledge source was activated in response to the added entry, then no further knowledge source can add any new entries to the data store 52 to cause further discovery. At such point, the finalPass( ) method is called to indicate that discovery has ended and invoke certain knowledge sources, such as any data cleanser 62 and data plunger 64 knowledge sources that perform various operations after the final pass state is entered. For instance, discovery may end when the last discovered storage device in the SAN 2 and all components contained therein, such as any logical unit numbers, ports, etc., are discovered. At such point there may be no further components to discover and no knowledge source may process an entry added for the last component discovered in the last storage device, thereby triggering the finalPass( ) method.

Figure 6:
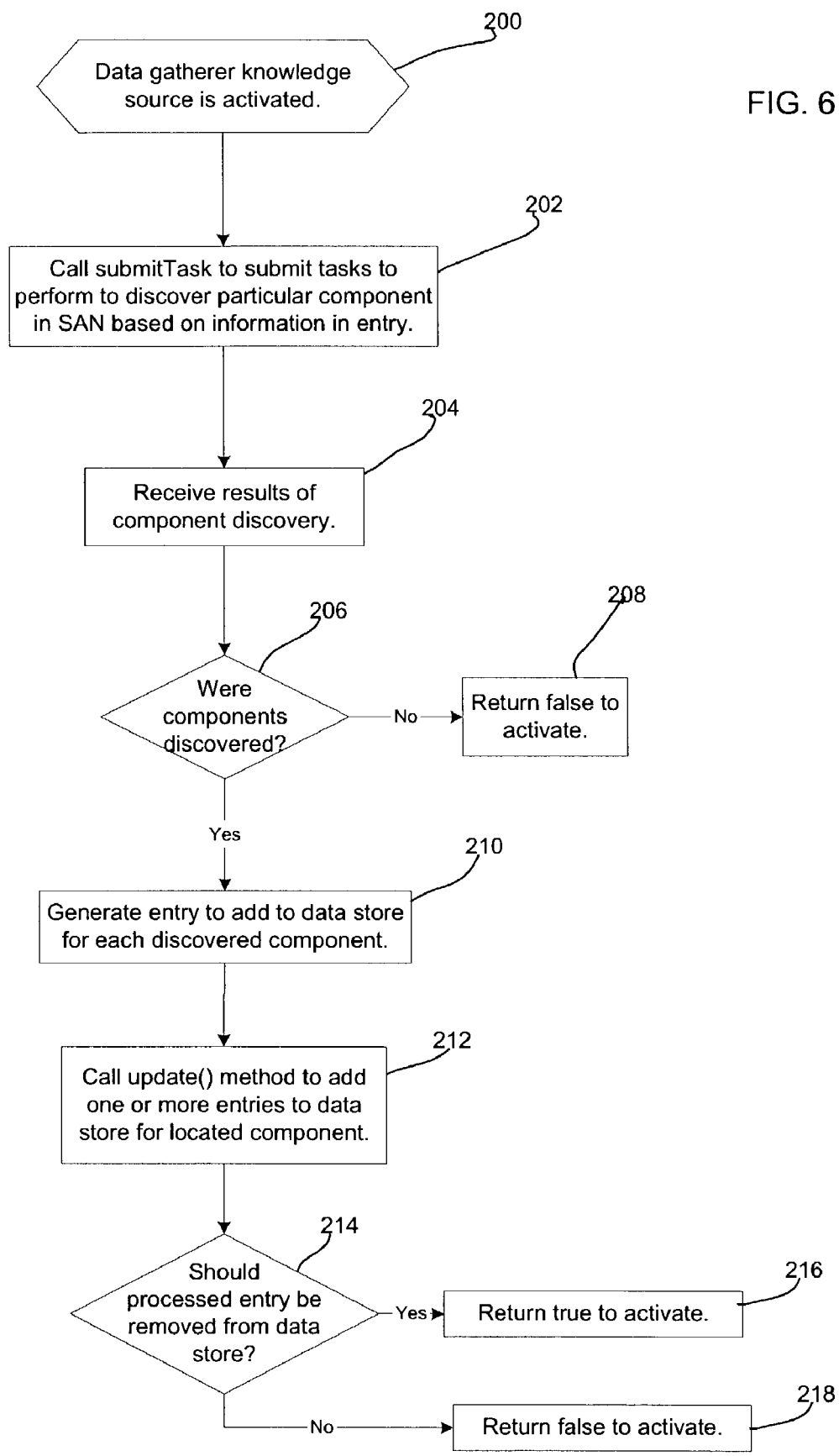

FIG. 6 illustrates an example of the operations that may be performed by a data gatherer knowledge source 58, where a separate data gatherer knowledge source may be provided for different types of SAN components and/or subcomponents. For instance, specific data gatherer knowledge sources 58 may perform discovery with respect to a host, another with respect to HBAs, another with respect to ports, switches, switch ports, switch cards, storage systems, storage ports, zones, programs, logical units, physical and logical connections between devices, etc. In this way the existence of all the SAN components and their interrelationship is discovered and entries added to the data store 52 for such discovered components and relationships.

With respect to FIG. 6, control begins at block 200 upon a data gatherer knowledge source 58 being activated by the blackboard control logic 54. The activated data gatherer 58 would then call the submitTask( ) function to submit discovery operation tasks to the task manager 68 to queue and execute. Such data discovery operations may utilize industry wide standard and/or proprietary management interfaces provided by device vendors whose devices participate in the SAN, where such management interfaces query and discover information on specific SAN components and subcomponents, e.g., hosts, switches, storage systems, ports, HBAs, switch ports, logical devices, programs, connections etc. The discovery related tasks spawned by the data gatherers 58 may alternatively use a common protocol to access device information, where different vendor's provide management functions that may be accessed using this common protocol. For instance, such common protocol may comprise the Common Information Model (CIM) operations over an HyperText Transfer Protocol (HTTP) protocol, which is used to exchange device information for different device types and devices from different vendors. Alternatively, any other management interface known in the art may be used to access information on devices in the network. In certain implementations, the tasks spawned by the data gatherers 58 may perform the steps at blocks 204 through 214. In alternative implementations, if a Task performed these steps, the queued task would not return true or false to the blackboard. Instead, the Task would be queued to perform the KnolwedgeSource operations, and after submitting the Task, the KnowledgeSource would return true or false to the activate( ) call.

Upon receiving (at block 204) the results of the device discovery operations, if (at block 206) SAN components were not discovered then no entries are added to the data store. Otherwise, if (at block 208) SAN components are discovered, then the task invoked by the data gatherer knowledge source 58 generates (at block 210) an entry for each discovered component for the data store 52. The submitted task calls (at block 212) the update( ) function to add the generated one or more entries to the data store 52. If (at block 214) the data entry is to be removed from the data store 52 so that no further KnowledgeSources may process the entry, then the data gatherer 58 returns (at block 216) "true" from the activate( ) call so that the blackboard control logic 54 will remove the entry from the data store 52 and cease asking anymore knowledge sources to process the entry. Otherwise, if the entry is not to be removed, then the data gatherer 58 returns (at block 218) "false" so that the blackboard control logic 54 will not remove the entry and allow other knowledge sources in the array 56 the opportunity to process the added entry. As mentioned, adding an entry to the data store 52 triggers the logic of FIG. 5 where the blackboard control logic 54 calls isApplicable( ) to find a knowledge source to process the added entry.

Figure 7:
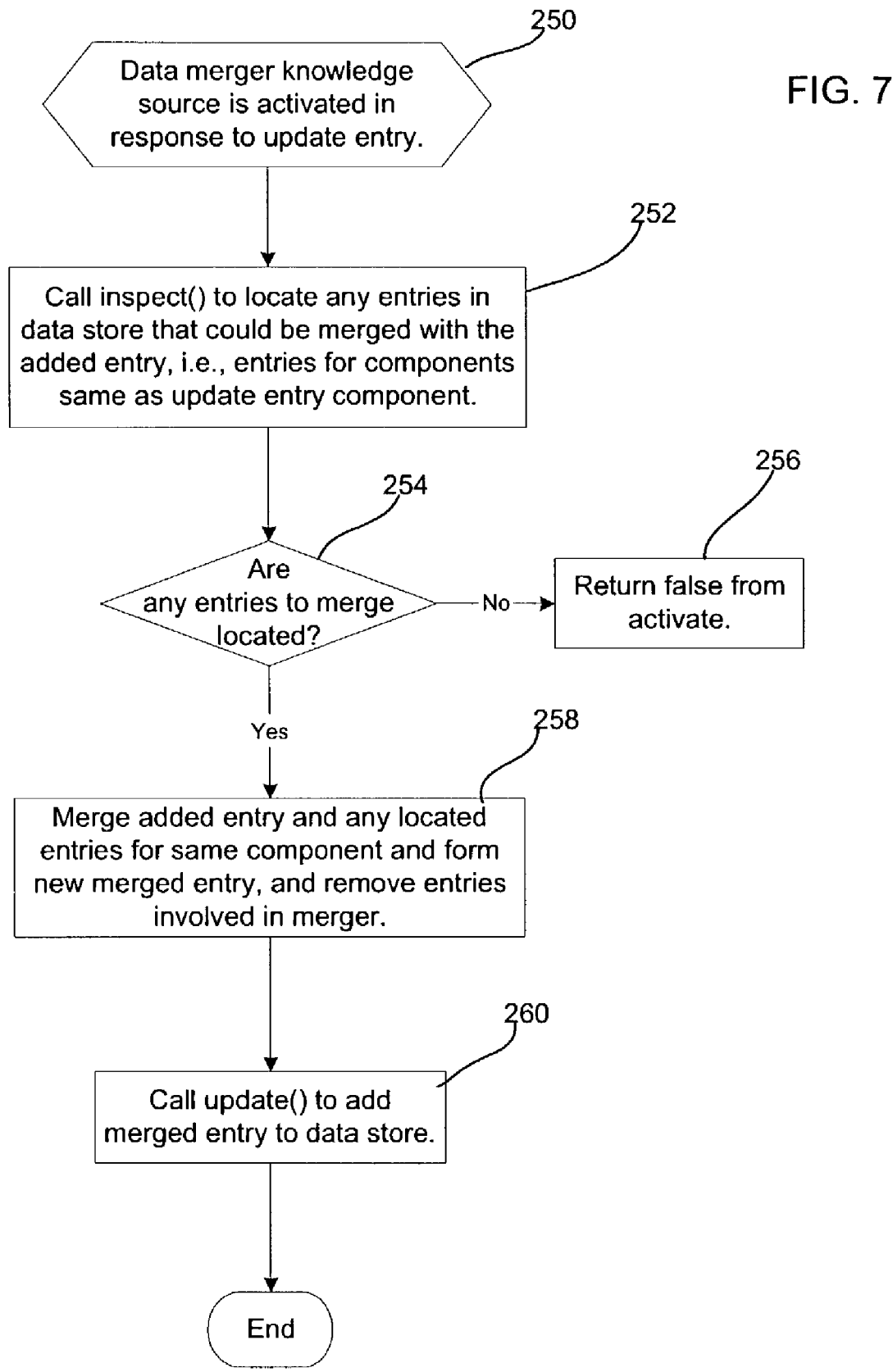

FIG. 7 illustrates logic implemented in a data merger knowledge source 60 to correct any inconsistencies between an added entry and other pending entries in the data store 52. There may be one data merger knowledge source to handle inconsistencies for entries for any SAN component or a separate data merger knowledge source to handle inconsistencies for different types of SAN components. A data merger knowledge source would be activated to check any entry for a SAN component which it is coded to handle. For instance, an HBA data merger knowledge source would be activated whenever the new added entry to the data store 52 is for an HBA component. With respect to FIG. 7, control begins at block 250 upon an activation of a data merger knowledge source 60. In response, the activated data merger would call (at block 252) the inspect( ) function to locate any SAN component entries in the data store 52 that could be merged with the added entry, i.e., where the pending entries in the data store 52 are for the same component, have the same hostname, world wide name, etc. as the added entry. If (at block 254) there are no pending entries in the data store 52 eligible for merger, then the data merger 60 returns (at block 256) "false" to the calling blackboard control logic 54. Otherwise, if the entries in the data store are for the same type of SAN component as the added entry, then the activated data merger 60 merges (at block 258) the added entry and any located entries in the data store 52 into a new merged entry. The data merging process may involve combining information from the merged entries that is consistent and removing any information from older entries that is inconsistent with information from the added entry and/or newer entries. The entries involved in the merger may be removed from the data store 52 with a call to the take( ) function and the new merged entry is added (at block 260) to the data store 52 with the update( ) function, which again triggers the process of FIG. 5. In certain implementations, the data merger may operate on objects within an entry, where each entry is comprised of multiple objects. In such implementations, the data merger would update the blackboard data store 52 with individually merged objects, and not the entire entry.

Figure 8:
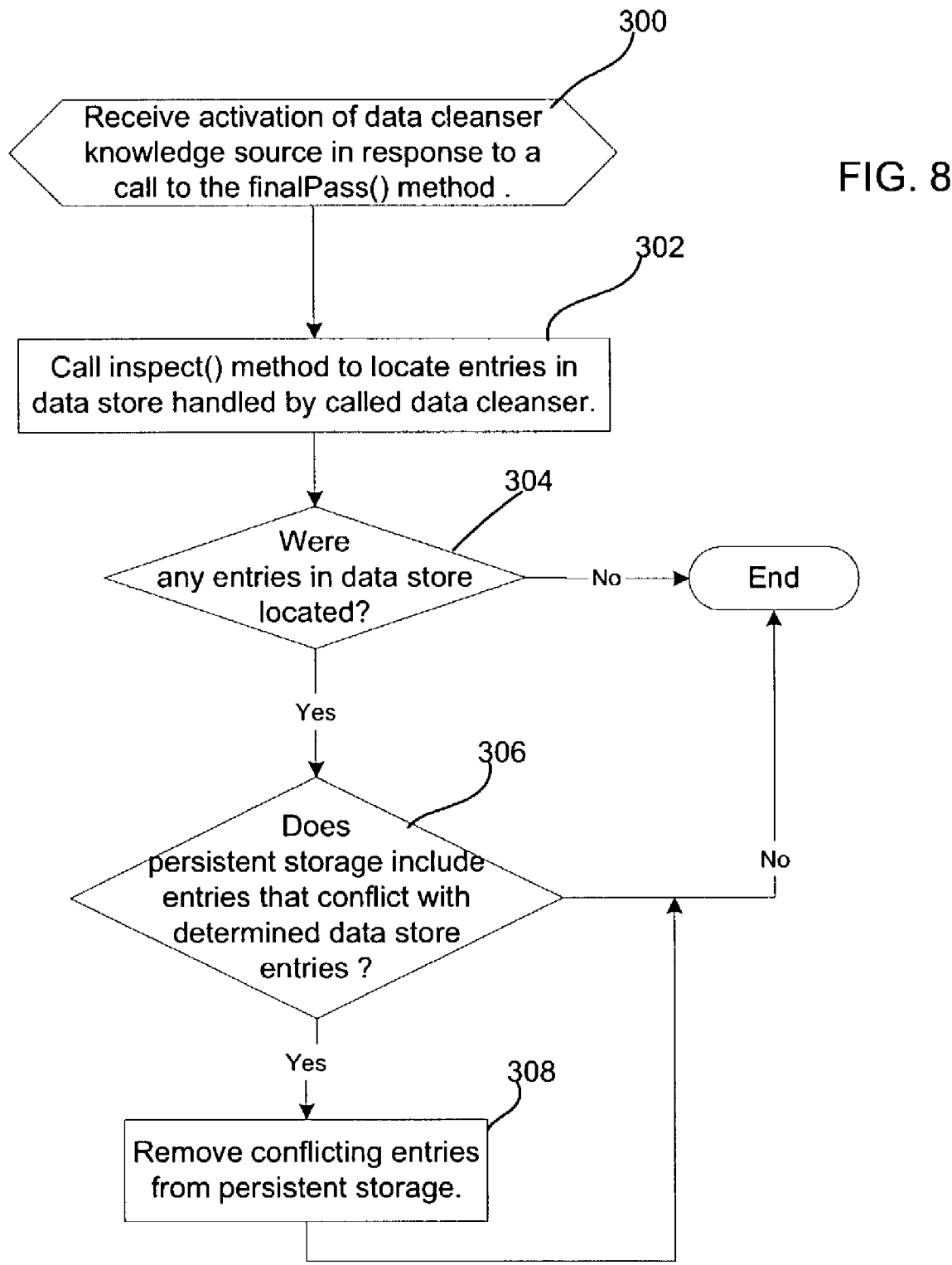

FIG. 8 illustrates logic implemented in a data cleanser knowledge source 62 to remove entries from persistent storage 66 during the final pass that are inconsistent with newer entries in the blackboard data store 52 added during the current discovery session. As discussed, the finalpass( ) method may be called when no knowledge source returns "true" to the isApplicable( ) call and there are no pending tasks in the task queue 70, which is the point that the blackboard control logic 54 determines to end SAN discovery. Control begins at block 300 when a data cleanser knowledge source 62 is activated in response to a call to the finalpass( ) method. In response, the data cleanser 62 calls (at block 302) the inspect( ) method to locate entries in the data store 52. If (at block 304) entries were not located in response to the inspect( ) call, control ends; otherwise, the activated data cleanser 62 determines (at block 306) whether any entries in persistent storage 66 and the data store 52 provide information for the same SAN components. If not, control ends; otherwise, the data cleanser 62 may remove (at block 308) such conflicting entries from persistent storage 66.

Figure 9:
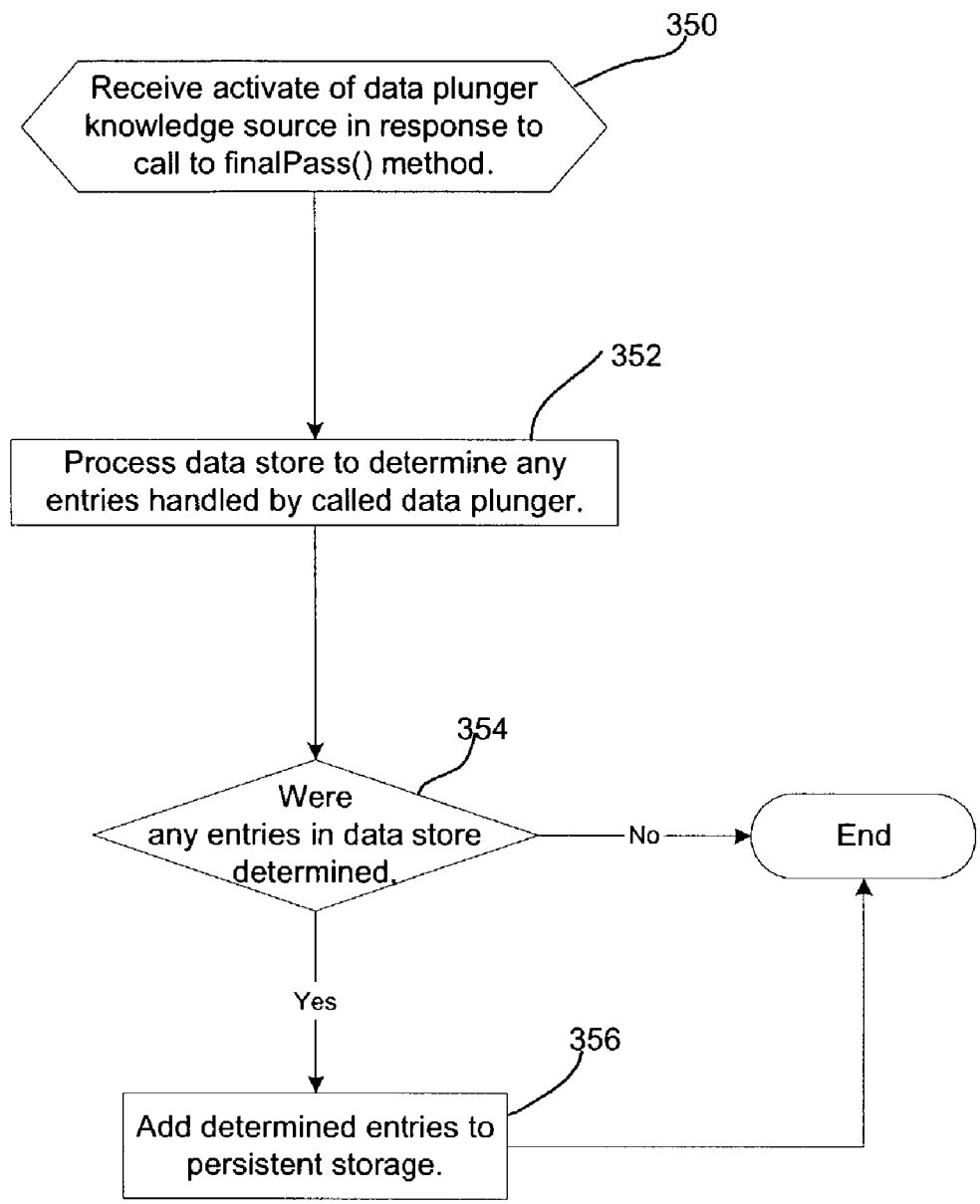

FIG. 9 illustrates logic implemented in a data plunger knowledge source 64 to add entries from the blackboard data store 52 to persistent storage 66 during the final pass, which is the point that the blackboard control logic 54 determines to end SAN discovery. Control begins at block 350 when a data cleanser knowledge source 62 is activated in response to the call to the finalpass( ) function. In response, the data plunger 64 calls (at block 352) the inspect( ) method to locate entries in the data store 52 handled by the activated data plunger 64. There may be one data plunger to process all data store entries or multiple data plungers 64 for different types of SAN components. If (at block 354) entries were not located in response to the inspect( ) call, control ends; otherwise, the activated data plunger 64 adds (at block 356) the determined data store 52 entries to persistent storage 66.

The described implementations thus provide a technique to discover components in a SAN in a non-deterministic manner, such that the algorithm continues to discover SAN components until a point is reached, i.e., the final pass. This final pass point may be reached even though there may be further SAN components not yet discovered. This allows the SAN discovery routine to handle any changes to the SAN that occurred because the discovery operation is not locked into a fixed search. With the described implementations, the discovery operations performed may vary each time the discovery process is invoked because the information located and added to the blackboard drives the knowledge sources that are called to gather further SAN component information.

ADDITIONAL IMPLEMENTATION DETAILS

The described techniques for discovering network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The described implementations discussed maintaining information on components within a SAN. However, those skilled in the art will appreciate that the device management techniques described herein may be utilized to maintain information on components within any network environment known in the art.

The described implementations utilize a blackboard architecture for discovering components in a SAN. In alternative implementations, other frameworks may be used to detect the SAN components in a non-deterministic manner. In such non-blackboard implementations, the functionality described with respect to the blackboard and knowledge sources would be implemented in alternative programming architectures and frameworks. For instance, the knowledge sources may be implemented by programs or routines that are called to perform the operations described with respect to the different knowledge sources.

The described implementations provided examples of four types of knowledge sources: data gatherer, data merger, data cleanser, and data plunger. In alternative implementations the functionality of these different types of knowledge sources may be combined into fewer types of knowledge sources or distributed into a greater number of types of knowledge sources. Further, additional knowledge source types other than those described herein to perform discovery related operations may be provided.

In described implementations, the discovery tool components were implemented in an object-oriented language. In alternative implementations, non-object oriented programming languages may be used to implement the discovery components.

In the described implementations, the final pass state occurs when no knowledge source returns "true" to the isApplicable( ) call and when there are no pending tasks in the task queue. In alternative implementations, different conditions may need to be satisfied before the final pass state occurs.

The described discovery tool utilized specific classes and functions therein to perform the SAN discovery. In alternative implementations, a different class structure may be used to provide functions to perform SAN discovery related operations.

The illustrated logic of FIGS. 5–9 shows certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 10:
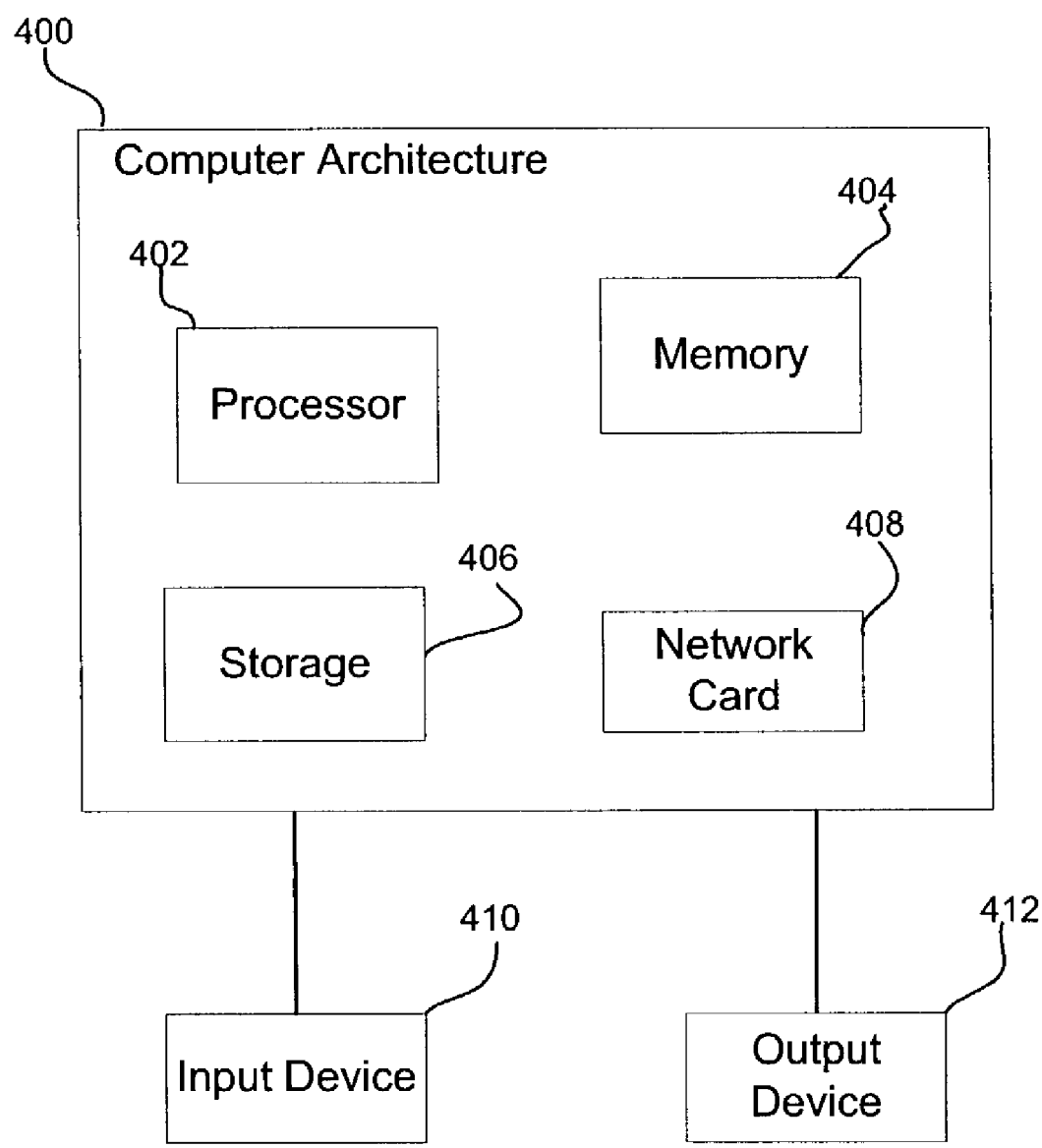
FIG. 10 illustrates a computer architecture that may be implemented in network components and other systems.

FIG. 10 illustrates one implementation of a computer architecture 400 that may be used with the SAN components and systems shown in FIGS. 1 and 2. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 810 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from-the spirit and scope of the invention, the invention resides in the claims hereinafter appended.

What is claimed is:

1. A computer implemented method for discovering components within a network, comprising:

initiating a discovery operation to discover a network component;

upon discovering information on one network component, adding an entry to a data store providing information on the discovered component;

in response to adding the entry to the data store, calling at least one of a plurality of programs to process the added entry, wherein each called program either accepts or declines to process the added entry;

initiating, with one program accepting to process the added entry, a further discovery operation that uses information in the added entry to discover network components in addition to the one network component in response to accepting the added entry; and adding a new entry to the data store providing information on one additional network component discovered during the further discovery operation and different from the one network component, wherein at least one program is called to process the new entry in response to adding the new entry.

2. The method of claim 1, wherein the steps of calling the programs to process a recently added entry to initiate further discovery operations are repeated to discover additional network components until a final pass state is reached.

3. The method of claim 1, further comprising:

detecting a final pass state; and in response to detecting the final pass state, making a call that causes at least one of the programs to perform operations.

4. The method of claim 3, wherein the final pass state occurs when all the called programs decline to process the added entry.

5. The method of claim 4, wherein the final pass state occurs when there are no pending discovery operations initiated by programs that have accepted one added entry.

6. The method of claim 3, wherein at least one of the programs that are activated in response to the final pass state performs:

determining entries in the data store that conflict with determined entries in persistent storage; and removing the determined entries in persistent storage.

7. The method of claim 6, wherein there is a plurality of programs that determine entries in the data store that conflict and remove the determined entries from the persistent storage, wherein the programs are associated with different types of network components.

8. The method of claim 3, wherein at least one of the programs that are activated in response to the final pass state performs:

adding the entries from the data store to persistent storage.

9. The method of claim 1, wherein programs are associated with different types of network components, and wherein the programs associated with different types of network components accept to process the added entry if the added entry includes information on the type of network component associated with the program.

10. The method of claim 1, wherein at least one program comprises a data merger program and in response to accepting to process the added entry, performs:

determining entries in the data store that conflict with the added entry;

merging the information of the determined entries and the added entry into a merged entry; and adding the merged entry to the data store, wherein in response to adding the merged entry, at least one of the programs is called to process the merged entry.

11. The method of claim 10, wherein data merger programs are associated with different types of network components, and wherein the data merger programs associated with different types of network components accept to process the added entry if the added entry includes information on the type of network component associated with the program.

12. The method of claim 1, further comprising:
providing a list of the programs;
in response to adding the entry to the data store, accessing one program in the list, wherein the accessed program is called and either accepts or declines to process the added entry; and
calling a next program in the list if the accessed program declines to process the added entry.

13. The method of claim 12, wherein the next program in the list is called until the end of the list is reached or until one program accepts to process the added entry and removes the added entry.

14. The method of claim 12, wherein the next program in the list is called after the program accepts to process the added entry.

15. The method of claim 1, wherein the program that initiates the further discovery operation generates the new entry for the data store based on the information on the network component discovered during the discovery operation and adds the new entry to the data store.

16. The method of claim 1, wherein the network components comprise one of a switch, switch ports, a host system, host bus adaptor (HBA), host ports, storage system, storage system ports, and zones.

17. The method of claim 1, wherein the computer implemented method is implemented in a blackboard architecture, wherein a blackboard component implements the data store and blackboard control calls the programs to process the added entry in response to entries being added to the data store, and wherein the programs comprise knowledge sources.

18. The method of claim 1, wherein the program that processes the added entry to initiate a discovery operation further performs:
submitting a discovery operation task to a task manager to execute, wherein the program completes processing the added entry upon submitting the discovery operation task.

19. The method of claim 18, wherein programs that accept to process added entries can submit concurrent tasks to perform concurrent operations with respect to at least one added entry.

20. A computer for discovering components within a network, comprising:
a data store;
a plurality of programs;
means for initiating a discovery operation to discover a network component;
means for adding an entry to the data store providing information on the discovered component upon discovering information on one network component;
means for calling at least one of the plurality of programs to process the added entry in response to adding the entry to the data store, wherein each called program either accepts or declines to process the added entry;
means for initiating, with one program accepting to process the added entry, a further discovery operation that uses information in the added entry to discover network components in addition to the one network component in response to accepting the added entry; and
means for adding a new entry to the data store providing information on one additional network component discovered during the further discovery operation and different from the one network component, wherein at least one program is called to process the new entry in response to adding the new entry.

21. The system of claim 20, wherein the means for calling the programs to process a recently added entry to initiate further discovery operations repeats the calling to discover additional network components until a final pass state is reached.

22. The system of claim 20, further comprising:
means for detecting a final pass state; and
means for making a call that causes at least one of the programs to perform operations in response to detecting the final pass state.

23. The system of claim 22, wherein the final pass state occurs when all the called programs decline to process the added entry.

24. The system of claim 23, wherein the final pass state occurs when there are no pending discovery operations initiated by programs that have accepted one added entry.

25. The system of claim 22, wherein at least one of the programs that are activated in response to the final pass state performs:
determining entries in the data store that conflict with determined entries in persistent storage; and
removing the determined entries in persistent storage.

26. The system of claim 20, wherein the programs are associated with different types of network components, and wherein the programs associated with different types of network components accept to process the added entry if the added entry includes information on the type of network component associated with the program.

27. The system of claim 20, wherein at least one program comprises a data merger program and in response to accepting to process the added entry, performs:
determining entries in the data store that conflict with the added entry;
merging the information of the determined entries and the added entry into a merged entry; and
adding the merged entry to the data store, wherein in response to adding the merged entry, at least one of the programs is called to process the merged entry.

28. The system of claim 20, further comprising:
a list of the programs;
means for accessing one program in the list in response to adding the entry to the data store, wherein the accessed program is called and either accepts or declines to process the added entry; and
means for calling a next program in the list if the accessed program declines to process the added entry.

29. The system of claim 20, wherein the network components comprise one of a switch, switch ports, a host system, host bus adaptor (HBA), host ports, storage system, storage system ports, and zones.

30. The system of claim 20, wherein the computer implemented method is implemented in a blackboard architecture, wherein a blackboard component implements the data store and blackboard control calls the programs to process the added entry in response to entries being added to the data store, and wherein the programs comprise knowledge sources.

31. The system of claim 20, wherein programs that accept to process added entries can submit concurrent tasks to perform concurrent operations with respect to at least one added entry.

32. A network discovery system, comprising:
a plurality of network components;
a discovery system;
a network enabling communication among the components and the discovery system;
wherein the discovery system includes:
(i) a data store;
(ii) a plurality of programs;
(iii) means for initiating a discovery operation to discover the components over the network;
(iv) means for adding an entry to the data store providing information on the discovered component upon discovering information on one network component;
(iv) means for calling at least one of the plurality of programs to process the added entry in response to adding the entry to the data store, wherein each called program either accepts or declines to process the added entry;
(v) means for initiating, with one program accepting to process the added entry, a further discovery operation that uses information in the added entry to discover network components in addition to the one network component in response to accepting the added entry; and
(vi) means for adding a new entry to the data store providing information on one additional network component discovered during the further discovery operation and different from the one network component, wherein at least one program is called to process the new entry in response to adding the new entry.

33. The system of claim 32, wherein the means for calling the programs to process a recently added entry to initlate further discovery operations repeats the calling to discover additional network components until a final pass state is reached.

34. The system of claim 32, wherein the discovery system further includes:
means for detecting a final pass state; and
means for making a call that causes at least one of the programs to perform operations in response to detecting the final pass state.

35. The system of claim 34, wherein the final pass state occurs when all the called programs decline to process the added entry and when there are no pending discovery operations initiated by programs that have accepted one added entry.

36. The system of claim 32, wherein the network components comprise one of a switch, switch ports, a host system, host bus adaptor (HBA), host ports, storage system, storage system ports, and zones.

37. The system of claim 32, wherein the computer implemented method is implemented in a blackboard architecture, wherein a blackboard component implements the data store and blackboard control calls the programs to process the added entry in response to entries being added to the data store, and wherein the programs comprise knowledge sources.

38. The system of claim 32, wherein the programs that accept to process added entries can submit concurrent tasks to perform concurrent operations with respect to at least one added entry.

39. An article of manufacture for discovering components within a network, wherein the article of manufacture is capable of causing operations to be performed, the operations comprising:
initiating a discovery operation to discover a network component;
upon discovering information on one network component, adding an entry to a data store providing information on the discovered component;
in response to adding the entry to the data store, calling at least one of a plurality of programs to process the added entry, wherein each called program either accepts or declines to process the added entry;
initiating, with one program accepting to process the added entry, a further discovery operation that uses information in the added entry to discover network components in addition to the one network component in response to accepting the added entry; and
adding a new entry to the data store providing information on one additional network component discovered during the further discovery operation and different from the one network component, wherein at least one program is called to process the new entry in response to adding the new entry.

40. The article of manufacture of claim 39, wherein the steps of calling the programs to process a recently added entry to initiate further discovery operations are repeated to discover additional network components until a final pass state is reached.

41. The article of manufacture of claim 39, further comprising:
detecting a final pass state; and
in response to detecting the final pass state, making a call that causes at least one of the programs to perform operations.

42. The article of manufacture of claim 41, wherein the final pass state occurs when all the called programs decline to process the added entry.

43. The article of manufacture of claim 42, wherein the final pass state occurs when there are no pending discovery operations initiated by programs that have accepted one added entry.

44. The article of manufacture of claim 41, wherein at least one of the programs that are activated in response to the final pass state performs:
determining entries in the data store that conflict with determined entries in persistent storage; and
removing the determined entries in persistent storage.

45. The article of manufacture of claim 44, wherein there is a plurality of programs that determine entries in the data store that conflict and remove the determined entries from the persistent storage, wherein the programs are associated with different types of network components.

46. The article of manufacture of claim 41, wherein at least one of the programs that are activated in response to the final pass state performs:
adding the entries from the data store to persistent storage.

47. The article of manufacture of claim 39, wherein programs are associated with different types of network components, and wherein the programs associated with different types of network components accept to process the added entry if the added entry includes information on the type of network component associated with the program.

48. The article of manufacture of claim 39, wherein at least one program comprises a data merger program and in response to accepting to process the added entry, performs:
determining entries in the data store that conflict with the added entry;
merging the information of the determined entries and the added entry into a merged entry; and adding the merged entry to the data store, wherein in response to adding the merged entry, at least one of the programs is called to process the merged entry.

49. The article of manufacture of claim 48, wherein data merger programs are associated with different types of network components, and wherein the data merger programs associated with different types of network components accept to process the added entry if the added entry includes information on the type of network component associated with the program.

50. The article of manufacture of claim 39, further comprising:
providing a list of the programs;
in response to adding the entry to the data store, accessing one program in the list, wherein the accessed program is called and either accepts or declines to process the added entry; and
calling a next program in the list if the accessed program declines to process the added entry.

51. The article of manufacture of claim 50, wherein the next program in the list is called until the end of the list is reached or until one program accepts to process the added entry and removes the added entry.

52. The article of manufacture of claim 50, wherein the next program in the list is called after the program accepts to process the added entry.

53. The article of manufacture of claim 39, wherein the program that initiates the further discovery operation generates the new entry for the data store based on the information on the network component discovered during the discovery operation and adds the new entry to the data store.

54. The article of manufacture of claim 39, wherein the network components comprise one of a switch, switch ports, a host system, host bus adaptor (HBA), host ports, storage system, storage system ports, and zones.

55. The article of manufacture of claim 39, wherein the computer implemented method is implemented in a blackboard architecture, wherein a blackboard component implements the data store and blackboard control calls the programs to process the added entry in response to entries being added to the data store, and wherein the programs comprise knowledge sources.

56. The article of manufacture of claim 39, wherein the program that processes the added entry to initiate a discovery operation further performs:
submitting a discovery operation task to a task manager to execute, wherein the program completes processing the added entry upon submitting the discovery operation task.

57. The article of manufacture of claim 56, wherein programs that accept to process added entries can submit concurrent tasks to perform concurrent operations with respect to at least one added entry.

* * * * *